United States Patent [19]

Kasting et al.

[11] 4,284,037
[45] Aug. 18, 1981

[54] INTERNAL COMBUSTION ENGINE COOLANT SYSTEM

[75] Inventors: Edward W. Kasting, Seymour; Richard E. Glasson, Columbus, both of Ind.

[73] Assignee: Cummins Engine Company, Inc., Columbus, Ind.

[21] Appl. No.: 970,257

[22] Filed: Dec. 18, 1978

[51] Int. Cl.³ ............................ F01P 3/02; F01P 3/16
[52] U.S. Cl. ............................. 123/41.72; 123/41.31; 123/41.82 R
[58] Field of Search ............... 123/41.76, 41.77, 41.79, 123/41.82, 41.85, 41.72, 41.31, 191 R

[56] References Cited

U.S. PATENT DOCUMENTS

| | | | |
|---|---|---|---|
| 1,793,713 | 2/1931 | Morrill | 123/41.76 |
| 2,739,579 | 3/1956 | Ware et al. | 123/41.82 X |
| 3,313,278 | 4/1967 | Thuesen | 123/191 R X |
| 3,491,731 | 1/1970 | Dinger et al. | 123/41.82 |
| 4,009,693 | 3/1977 | Bailey et al. | 123/41.82 |
| 4,106,444 | 8/1978 | Deutschmann et al. | 123/41.82 |
| 4,214,560 | 7/1980 | Nikly | 123/41.77 |

Primary Examiner—Charles E. Phillips
Attorney, Agent, or Firm—Merriam, Marshall & Bicknell

[57] ABSTRACT

This disclosure relates to a reciprocating piston internal combustion engine including a block and a head secured to the upper side of the block. A coolant circulation pump and manifolds are provided on one side of the block, and coolant inflow and outflow passages are formed through the side of the block and leading to the manifolds. A flow path is provided for each engine cylinder, the coolant for each cylinder flowing from a feed manifold and an inflow passage, around a cylinder, into the head, around the cylinder valves and injector, into the block, and out of the outflow passges to a collection manifold.

12 Claims, 11 Drawing Figures

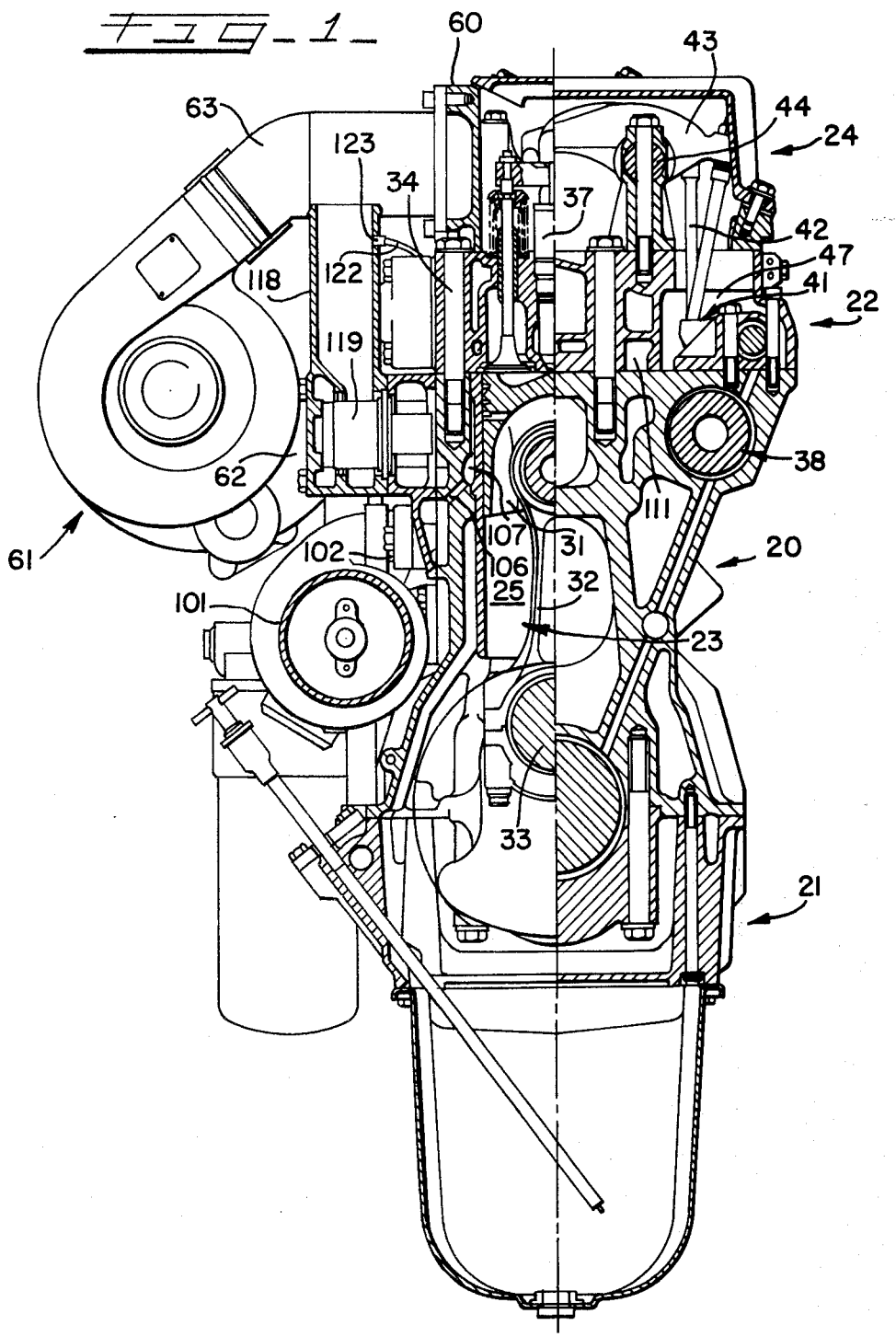

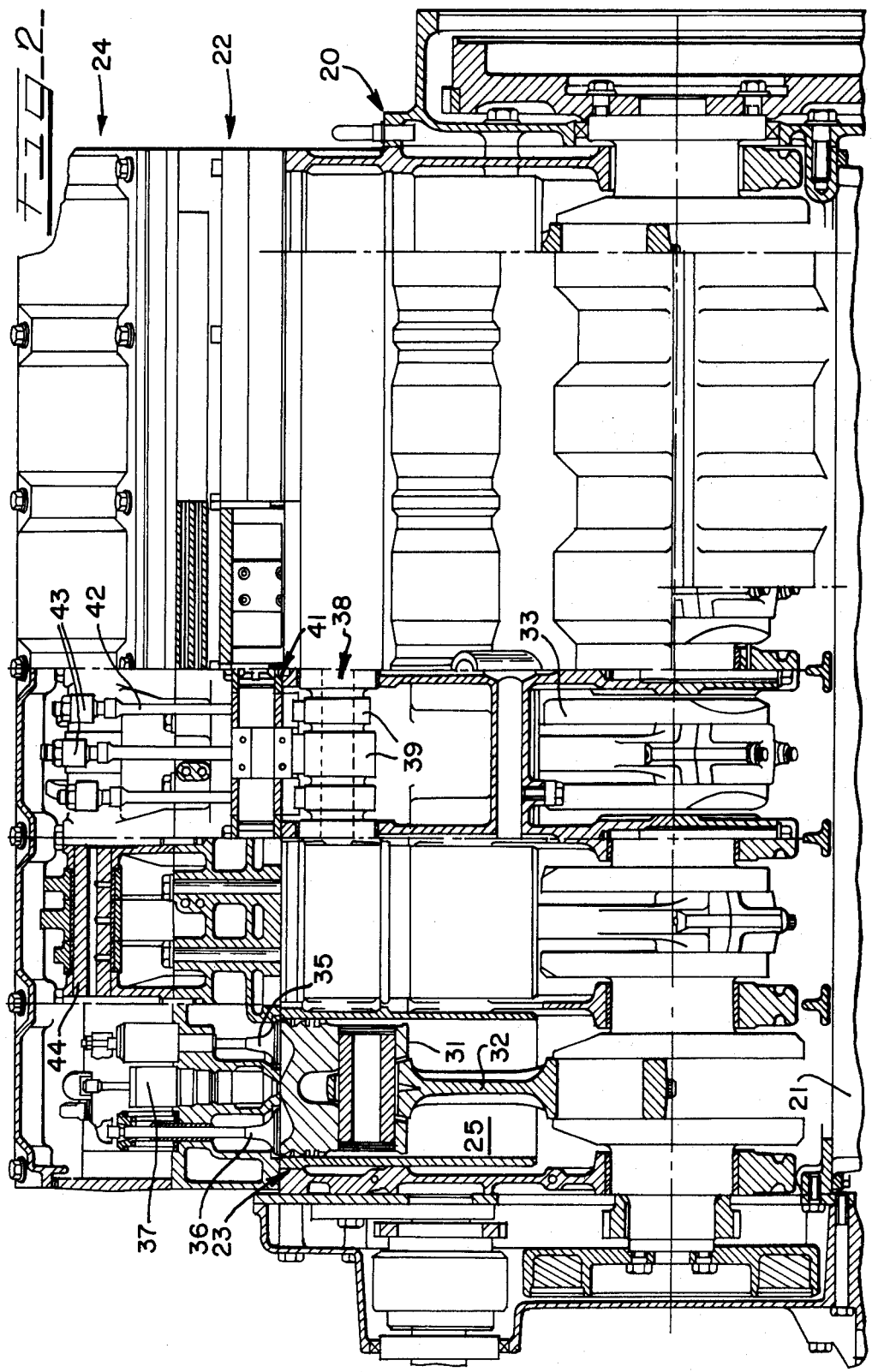

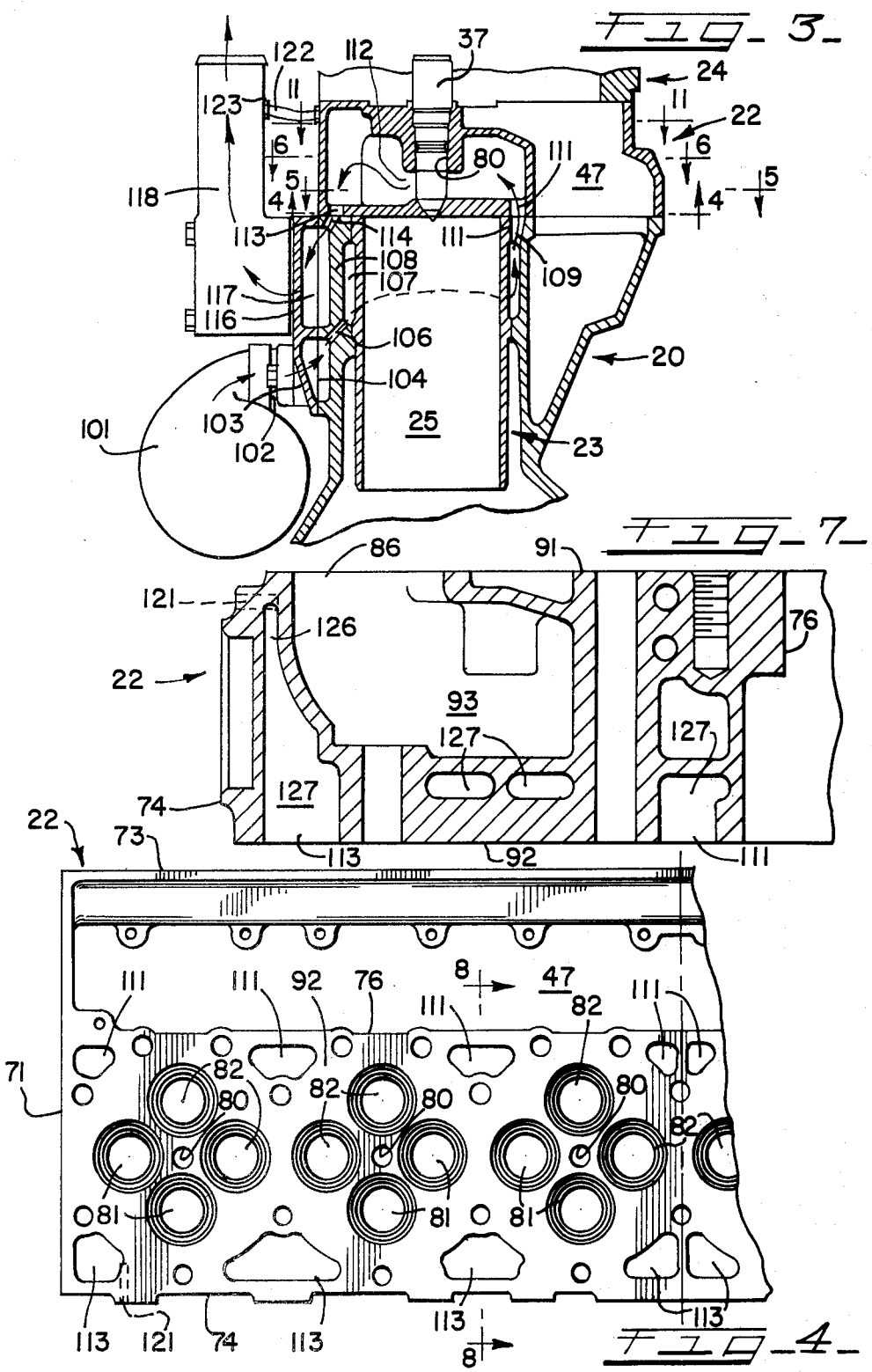

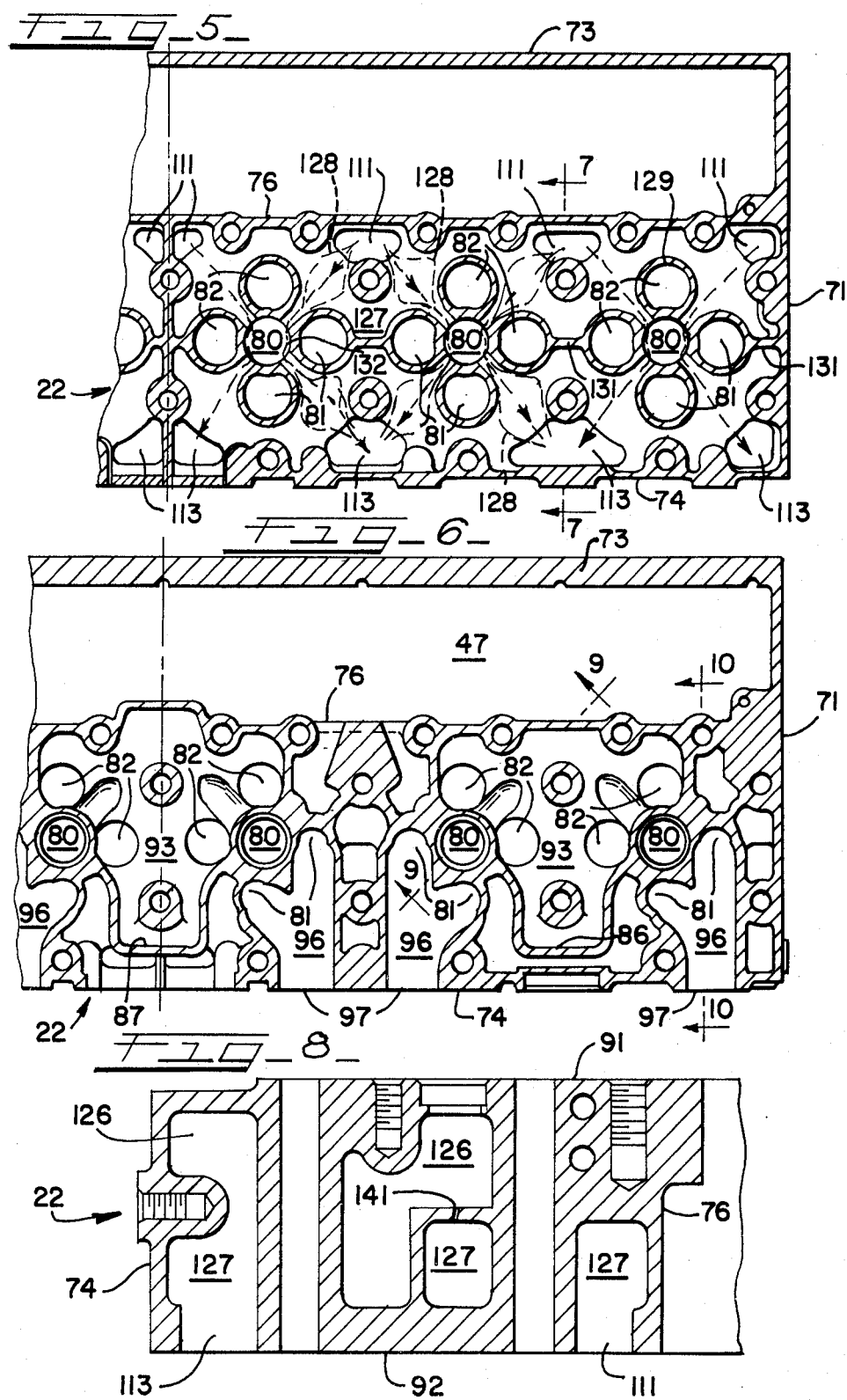

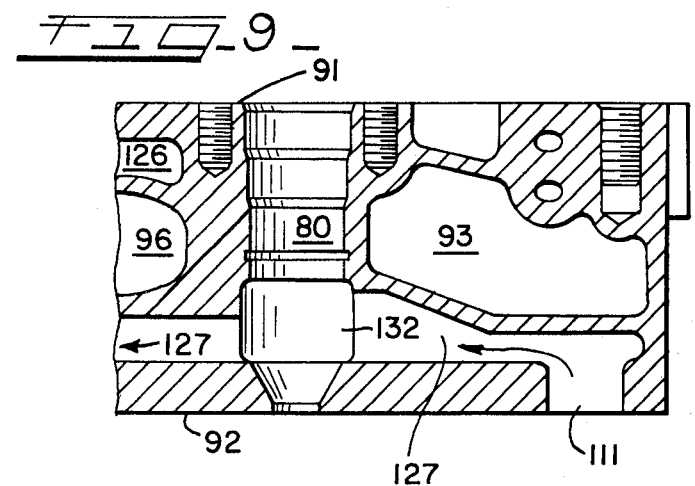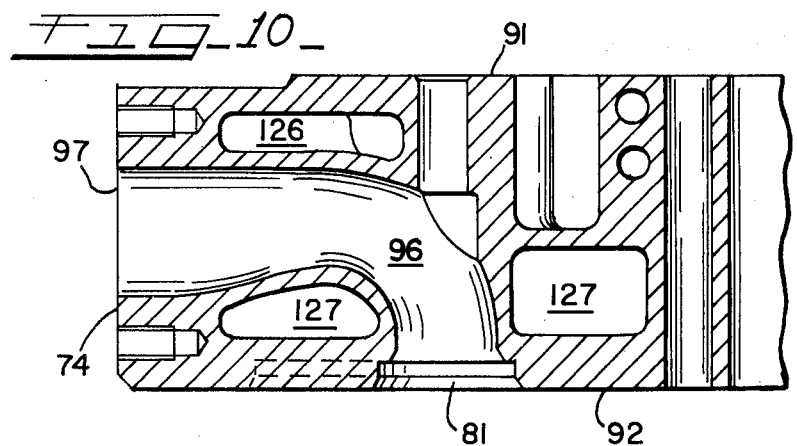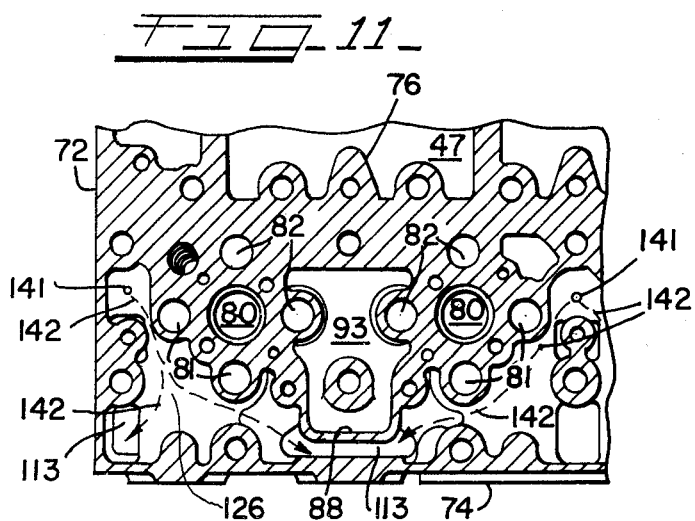

INTERNAL COMBUSTION ENGINE COOLANT SYSTEM

A well known type of internal combustion engine, such as a diesel engine, includes at least one line of cylinders formed in a block. A head is secured to the upper side of the block and supports, for each cylinder, a plurality of valves and an injector. Such a prior art engine also normally has a liquid cooling system including a circulating pump and passages formed in the head and in the block. The coolant leaves the pump and enters a feed manifold on the block, flows through and out of the block and into passages in the head, through the head and into a collection manifold fastened to a side of the head, and then either to a radiator or to a return line leading to the pump.

The foregoing conventional arrangement has the disadvantage that a separate collection manifold must be made part of the head or fastened to the side of the head. Thus the collection manifold is relatively high on the engine, and the thermostat and the pump intake must be at least as high as the outflow passage of the head for proper venting, and this is a disadvantage. The conventional arrangement has the further disadvantage that it is not possible to closely control the quantity of coolant flow associated with each cylinder, because in a conventional engine, the coolant flow through common channels in the head.

It is a general object of the present invention to provide an engine including an improved coolant system that avoids the foregoing disadvantages.

An engine in accordance with the invention comprises a block forming a plurality of cylinders, and a head attached to the block and supporting intake and exhaust valves and an injector for each cylinder. Coolant feed and collection manifolds are provided on one side of the block adjacent each other, and a coolant pump is mounted adjacent to and connects with the manifolds on the block. For each cylinder, separate flow passages are formed in the block which conduct the coolant from the feed manifold, around the cylinder, up and into the head, across the head and adjacent the injector and the valves, down from the head, and into the collection manifold on the block. The pump is mounted below the head and the passages in the head. Vents and a low capacity coolant flow path are also provided in the head, and means is provided for connecting the uppermost head passages to a coolant line that leads for example to a coolant duct that is relative high on the engine.

The foregoing and other advantages and features of the present invention will become apparent from the following detailed description taken in conjunction with the accompanying figures of the drawings, wherein:

FIG. 1 is a view partially in section of the front of an engine embodying the present invention;

FIG. 2 is a view partially in section of the side of the engine shown in FIG. 1;

FIG. 3 is a fragmentary sectional view of the engine;

FIG. 4 is a fragmentary enlarged view taken on the line 4—4 of FIG. 3 showing the head of the engine;

FIG. 5 is a fragmentary enlarged sectional view taken on the line 5—5 of FIG. 3;

FIG. 6 is a fragmentary enlarged sectional view taken on the line 6—6 of FIG. 3;

FIG. 7 is a fragmentary additional view taken on the line 7—7 of FIG. 5;

FIG. 8 is a fragmentary sectional view taken on the line 8—8 of FIG. 4;

FIG. 9 is a fragmentary sectional view taken on the line 9—9 of FIG. 6;

FIG. 10 is a fragmentary sectional view taken on the line 10—10 of FIG. 6; and

FIG. 11 is a fragmentary sectional view taken on the line 11—11 of FIG. 3.

The drawings illustrate the invention as applied to an in-line six cylinder diesel engine, but it should be understood that the principles of the invention may also be applied to other engine types, such as in-line four or eight cylinder engines, or V-type engines.

With reference to FIGS. 1 and 3, the engine includes a block 20, a crankcase and pan 21, a head 22, and a rocker housing and cover 24. Formed in the block 20 are six inline cylinders, the No. 1 cylinder 23 being shown in section in FIGS. 1 to 3. Each of the cylinders includes a liner 25 and, reciprocating within each of the liners, a piston 31 fastened to the upper end of a connecting rod 32. The six connecting rods 32 are rotatably fastened to a crankshaft 33 which in turn is rotatably supported on the block of the engine 20 by bearings. The crankcase and pan 21 are secured to the underside of the block 20 and enclose various operating parts of the engine, and the form a sump or reservoir for the lubricant of the engine.

The head 22 of the engine is secured to the upper side of the block 20 by a plurality of bolts or studs 34 (FIG. 1), and the head supports, for each of the cylinders, a fuel injector 37, a pair of intake valves and a pair of exhaust valves. One intake valve 35 and one exhaust valve 36 are shown in FIG. 2, and the valve configuration will be described in greater detail hereinafter. The injector 37 and the four valves of each cylinder are operated in synchronism with the other operating parts of the engine by a camshaft 38 that is geared to the crankshaft and has a series of cams 39 (FIG. 2) on it. For each cylinder, one cam operates the injector 37, another cam or cams operate the two intake valves and another cam or cams operate the two exhaust valves. For each of these cam drives, a cam follower follows the outer surface of the associated cam 39 and a push rod 42 connects the follower 41 with one end of a rocker arm 43 that is pivotally supported on a rocker shaft 44. The other ends of the rocker arms 43 operate the injectors and the valves. During operation of the engine, toward the end of each compression stroke of the piston 31, the injector cam drives the push rod 43 upwardly, thereby forcing the injector plunger downwardly in order to inject fuel into the upper end of the cylinder 23. The valves are similarly operated, the intake valves being opened during the air intake stroke of the piston 31 and the exhaust valves being opened during the exhaust stroke of the piston 31. As shown in FIGS. 1 and 2, the camshaft 38 is rotatably mounted near the upper end of the block 20 and the cam followers are located in openings 47 formed in the head 22 adjacent the associated cylinder.

Intake air and exhaust passages are formed in the head 22 and in a rocker housing 60 as will be described hereinafter. A turbocharger unit 61 FIG. 1 is provided to supply the intake air, the turbocharger 61 being driven by the exhaust gases of the engine. The turbocharger may be generally conventional in design and includes a turbine that receives exhaust gases through an exhaust manifold formed by a plurality of ducts 62 connected between the head 22 and the turbine. The turbocharger 61 further includes a compressor that supplies intake air under pressure to the engine cylinders, the compressor output being connected by a duct 63 to the adjacent side of the rocker housing 60. An aftercooler may be provided between the duct 63 and the housing 60. The turbocharger unit 61 is mounted on one side of the engine and the exhaust and intake ducts 62 and 63 connect with the head 22 and with the rocker housing 60 on the same side of the engine.

FIGS. 4 to 11 illustrate the construction of the head 22 in greater detail. The head 22 normally is a cast member and includes two end walls 71 and 72 and two outer side walls 73 and 74, the four walls 72 through 74 forming a generally rectangular configuration. The head further includes upper and lower walls 91 and 92 and an inner wall 76 that extends between the two end walls 71 and 72. The spaces between the outer wall 73 and the inner wall 76 form the openings 47 for the cam followers 41 and for the push tubes 42.

The arrangement of the intake and the exhaust ports and the injectors for the cylinders is best illustrated in FIGS. 4 and 11. For each cylinder, the associated injector 37 is mounted in a hole 80 formed in the head 22 on the axial centerline of the cylinder. The lower end of the injector extends into the cylinder or combustion chamber as shown in FIG. 2 and as is well known to those skilled in the art. For each cylinder there is also provided in the head 22 two exhaust ports 81 and two intake ports 82, the four ports 81 and 82 being spaced at 90 intervals around the injector hole 80 and the axis or centerline of the cylinder. The valves 35 and 36 are, of course, mounted in the ports 81 and 82. For each of the cylinders, the centers of one of the ports 81 and one of the ports 82 are located in a vertical plane extending parallel to the side walls 73 and 74, and passing through the cylinder axis. The other two of the ports 81 and 82 of each cylinder are in a vertical plane extending perpendicular to the first mentioned plane and passing through the cylinder axis. The port 82 of each cylinder which is closest to the inner wall 76 is an intake port whereas the port 81 which is most closely adjacent to the other side wall 74 is an exhaust port.

In the six cylinder engine illustrated, the cylinders Nos. 1 and 2 form a pair, the two cylinders Nos. 3 and 4 form another pair, and the two cylinders Nos. 5 and 6 form still another pair, and the four intake ports 82 of each pair of cylinders receive intake air through a common intake opening. The most closely adjacent ports of the pair of cylinders Nos. 1 and 2 comprise the intake ports 82 and are on opposite sides of an intake opening 86 (FIGS. 6 and 7) formed in the upper wall 91 of the head 22. Similarly, the most closely adjacent intake ports 82 of the pair of cylinder Nos. 3 and 4 are on opposite sides of an intake opening 87, and the most closely adjacent intake ports 82 of the pair of cylinders Nos. 5 and 6 are on opposite sides of an intake opening 88 (FIG. 11). Connecting the openings 86, 87 and 88 with the intake ports 82 are three separate intake air passages or chambers 93 (FIGS. 6, 7, 9 and 11) formed within the head 22 between the upper and lower walls 91 and 92. Air flow passages (not shown) are formed in the rocker housing 60 which connect the openings 86, 87 and 88 to the air intake duct 63. Thus, the intake air flows from the compressor, through the duct 63, the passages in the rocker housing 60, the openings 86, 87 and 88, the chambers 93, and to the air intake ports 82.

While pairs of cylinders receive intake air from common chambers 93, the two exhaust ports 81 of each of the cylinders are connected by a separate passage 96 (FIGS. 6 and 10) to exhaust openings 97 formed in the side wall 74 of the block 22. Each of the passages 96 extends around the associated ports 81, and it curves upwardly and toward the side wall 74 as shown in FIG. 10. As previously mentioned, the exhaust manifold is formed by a plurality of ducts which connect with the openings 97 and separate the exhaust gases in accordance with well known pulse turbine techniques.

The previously mentioned rocker housing 60 is secured to the upper side of the head and it encloses the rocker arms and has the previously mentioned intake air passages formed in it for conducting the intake air from the duct 63 to the openings 86, 87 and 88 in the head.

The engine further includes a novel and improved liquid coolant flow system. With reference to FIGS. 1 and 3, the coolant system includes a coolant circulating pump 101 mounted on one side of the block 20 at approximately the level of the cylinders liners 25, and a short pipe or tube 102 that couples the pump outlet to a manifold 103 fastened to the side of the block 20 adjacent the pump 101. The manifold 103 forms a feed passage 104 that extends along substantially the length of the block 20 and adjacent the liners 25. Laterally adjacent each liner 25 is formed at least one and preferably two inflow holes 106 that extend through the wall of the block and connect the passage 104 with an annular coolant chamber 107 around the liner 25. The chamber 107 is bounded on its inner and outer sides by the liner and a wall 108 of the block, and on its upper and lower ends by sealed connections between the liner 25 and the block 20. The holes 106 are formed on the pump 101 side of the chamber 107 near the lower end of the chamber. At least one and preferably two outlet holes 109 are formed in the block 23 which connect the upper end of each chamber 107 with passages in the head, the holes 109 being on the opposite side of the block 20 from the holes 106. Aligned with each hole 109 is a hole 111 formed in the head 22, the holes 111 carrying coolant to flow passages 112 formed in the head. The passages 112 angle across the head and adjacent the associated injector 37 as will be described later. On the side of the engine which is adjacent the manifold 103 are formed a plurality of flow holes 113 in the head and holes 114 in the block. A coolant collection manifold 116 is formed on the side of the block 20 immediately above the feed manifold 103, which forms a passage 117 that connects with all of the holes 114. A tube or duct 118 (FIGS. 1 and 2) is coupled to the side of the manifold 116 and carries the coolant to, for example, an engine radiator (not shown). A thermostat 119 (FIG. 1) is preferably mounted in the duct 118.

In addition to the flow passages 113 leading from the head, an additional low capacity flow hole 121 (FIGS. 4, 7) is formed in the head 22 adjacent the upper side 91. The hole 121 is formed through the wall and connects with the uppermost end of coolant flow passages 112 as best shown in FIG. 3. A tube or flow line 122 couples the hole 121 to a fitting 123 attached to the side of the tube 118, the connection to the tube 118 being above the hole 121. Thus, the hole 121 and the tube 122 vent the uppermost part of the passages 112 and prevent any accumulation of air or steam in this upper side of the passages.

The flow passages 112 may be considered as being divided into an upper jacket 126, best shown in FIG. 9 to 11, and a lower jacket 127, best shown in FIGS. 5, 8, 9 and 10. With reference first to FIG. 5, the coolant flows through the holes 111, into the lower jacket 127, across the head and out of the holes 113. The path through the lower jacket is indicated by the dashed lines 128 in FIG. 5, and a large majority of the coolant flows through the lower jacket path. Tubular walls 129 are formed around the intake and exhaust ports 81 and 82, and partitions 131 extend between the walls 129 of the ports located on the longitudinal axis of the head, and between these walls 129 and the side walls 71 and 72, and these partitions prevent the coolant from flowing straight across the head from the holes 111 to the holes 113. The coolant is forced to flow at 45° angles along the dashed line paths 128 to the injector holes 80, and, as best shown in FIG. 9, a circular passage 132 is formed between the injectors 37 and the walls of the holes 80.

Each passage 132 is located around the lower portion of the injector, this portion being subjected to the heat from the combustion chamber, and the upper and lower ends of the passages 132 are of course sealed. Thus, the coolant in each path flows from a hole 111, between and around the walls 129 of a pair of the ports 81 and 82, through the passage 132, around an injector, between the walls 129 of the other pair of ports 81 and 82, and out of a hole 113. A plurality of such flowspaths 128 are formed by the lower jacket 127, each of the paths extending from a hole 111 and diagonally across the head to an adjacent injector and then to an outlet hole on the other side of the head. These paths 128 are substantially separated and the quantity of flow in each path is, of course, dependent on the size of the flow passages associated with the various paths. These sizes may be designed to obtain a uniform heat transfer pattern among the various cylinders.

The upper jacket 126 extends across substantially the length of the head on the side which is adjacent the outflow holes 113. Above each of the outflow holes 113, the two jackets 126 and 127 are in communication and they connect with the holes 113, and consequently coolant may flow out of both jackets through the holes 113. Coolant flows into the upper jacket from the lower jacket through at least one vent hole 141 (FIGS. 8 and 11). In the present example, four holes 141 are provided, one adjacent each end of the head, another between the No. 2 and No. 3 cylinders and the other between the No. 4 and No. 5 cylinders. The total flow area of the holes is relatively small, and therefore, the quantity of flow through the upper jacket is relatively small. With reference to FIG. 11, the flow through the upper jacket is along the paths indicated by the dashed lines 142, and the coolant flows from vent holes 141, over the tops of the exhaust passages 96 as shown in FIG. 10 and to the outlet holes 113 which are shown in FIGS. 5 and 8.

With reference to FIGS. 4 and 7, the hole 121 is formed in the wall 74 of the head and connects with the upper end of the upper jacket 126. In the present example, the hole 121 is located adjacent one end of the head and above the endmost outlet hole 113. The flow line 122 leads to the duct 118 which in turn may be connected to, for example, a radiator or an intercooler. By this arrangement, the uppermost side of the upper jacket 126 is vented by the hole 121 and the uppermost side of the lower jacket 127 is vented by the holes 141 and by the connections shown in FIG. 8 between the jackets 126 and 127. The foregoing venting arrangements prevent entrapment of air and steam in the passages of the head, any air or steam being released to the hole 121, the tube 122 and the duct 118. This arrangement is highly advantageous because proper venting is provided for even though the pump and its intake are well below the level of the passages in the head, and it enables the pump to be mounted at an advantageous low position adjacent the feed manifold.

The present construction has the further advantage that the coolant flow arrangement cooperates with the orientation of the intake and exhaust valves to provide improved cooling. The valve orientation wherein, for each cylinder, two valves are on the longitudinal axis of the head and the other two are on a line that is perpendicular to this axis, permits the coolant to flow on paths between pairs of valves to and from the injector, these paths being at 45° angles to the longitudinal axis. The coolant flows above and below the exhaust passages after having passed the injector, for more efficient cooling. The exhaust ports are relatively close to the exhaust manifold side of the head and the exhaust passages are relatively short, whereby the heated exhaust is removed from the head as quickly as possible.

Prior art engines have been provided including a low capacity vent line leading from the upper end of the coolant jacket in the head, but the prior art arrangement has the disadvantages that the vent line has been relatively long and it has been connected to the radiator. Since a manufacturer of engines may not supply the engine in combination with a radiator, the manufacturer must rely on the truck builder to make a proper connection of the vent line between the head and the radiator. In accordance with the present invention, the vent line is properly installed by the engine manufacturer because the pipe 118 is part of the engine.

What is claimed is:

1. A head for a multiple cylinder internal combustion engine having a block and a coolant system, said block having a plurality of coolant flow passages therein, said head having one surface adapted to be attached to the upper side of said block and having coolant inlet and coolant outlet openings formed in said one surface, said inlet openings being at one side of said head and said outlet openings being at the other side of said head, separated upper and lower coolant flow passages in said head and extending across said head between said inlet and outlet openings, and said inlet and outlet openings being adapted to communicate with said flow passages of said block and to conduct coolant to said flow passages of said head, both said upper and lower passages directly communicating with said outlet openings and coolant flowing to said outlet openings from said upper and lower passages.

2. A head as in claim 1, and further including a hole formed in said head and in communication with an upper portion of said upper flow passage of said head, said hole venting said head flow passages.

3. A head as in claim 1, said head having a plurality of openings formed therein adapted to receive injectors and having a plurality of internal partition walls formed in said lower flow passages thereof, said partition walls extending across said head flow passages but terminating at said injector holes, whereby coolant flows into said inlet openings and across said lower head flow passages to said outlet openings, and said partition walls cause said coolant to flow around said injector holes.

4. A head as in claim 3, wherein said head has a centerline passing through said injector holes, said head further including a plurality of internal walls forming two intake air ports and two exhaust ports for each cylinder, one intake air port and one exhaust port falling on said centerline and the other intake air port and the other exhaust port being on another line that is perpendicular to said centerline, and said coolant flowing at angles to said centerline and between said ports.

5. A head as in claim 4, wherein said upper passage extends above said exhaust passage and said lower passage extends below said exhaust passage, whereby said exhaust passage is substantially surrounded by said coolant passages.

6. A head as in claim 1, wherein said head includes a plurality of internal walls forming said lower passage and said upper passage, said lower jacket extending between said inlet and outlet openings and across said head, and at least one vent hole means interconnecting said upper and lower for flow of coolant from said lower passage to said upper passage.

7. A head as in claim 6, wherein said vent hole means is relatively restricted, whereby most of said coolant flows through said lower flow passage.

8. A head as in claim 6, and further including second vent hole means in said head and connected to the upper portion of said upper passage, said second vent holes means being adapted to be connected to a part of said coolant system that is higher than said upper passage for venting said upper and lower passages.

9. A head for a multiple cylinder internal combustion engine having a block and a coolant system, said block having a plurality of coolant flow passages therein, said head having one surface adapted to be attached to the upper side of said block and having coolant inlet and coolant outlet openings formed in said one surface, coolant flow passages in said head and extending across said head between said inlet and outlet openings, said inlet and outlet openings being adapted to communicate with said flow passages of said block and to conduct coolant through flow passages of said head, and a vent hole formed in said head and in communication with the upper side of said flow passages of said head, said vent hole being adapted to be connected to a part of said coolant system that is higher than said flow passages for venting said head flow passages.

10. A head as in claim 9, wherein said coolant system includes a radiator and a duct connecting said block flow passages with said radiator, and further including means adapted to connected said vent hole with said duct.

11. A head for a multiple cylinder internal combustion engine having a block and a coolant system, said block having a plurality of coolant flow passages therein, said head having one surface adapted to be attached to the upper side of said block and having coolant inlet and coolant outlet openings formed in said one surface, coolant flow passages in said head and extending across said head between said inlet and outlet openings, said inlet and outlet openings being adapted to communicate with said flow passages of said block and to conduct coolant through flow passages of said head, said inlet openings being formed in said one surface on one side of said head and said outlet openings being formed in said one surface on the other side of said head, said head having a plurality of openings formed therein adapted to receive injectors and having a plurality of internal partition walls formed in said flow passages thereof, said partition walls extending across said head flow passages but terminating at said injector holes, whereby coolant flows into said inlet openings and across said head flow passages to said outlet openings, and said partition walls cause said coolant to flow around said injector holes, said head having a centerline passing through said injector holes, said head further including a plurality of internal walls forming two intake air ports and two exhaust ports for each cylinder, one intake air port and one exhaust port falling on said centerline and the other intake air port and the other exhaust port being on another line that is perpendicular to said centerline, and said coolant flowing at angles to said centerline and between said ports.

12. A head as in claim 11, wherein said head further has formed therein a common exhaust passage that is connected to said two exhaust ports, and said head flow passages extend substantially around said exhaust passage.

* * * * *